United States Patent
Braschel et al.

[11] Patent Number: 5,140,260
[45] Date of Patent: Aug. 18, 1992

[54] METHOD OF EXAMINING FUNCTIONABILITY OF A WHEEL SPEED SENSOR

[75] Inventors: Volker Braschel; Dieter Seitz, both of Neuwied, Fed. Rep. of Germany

[73] Assignee: Lucas Industries public limited company, Birmingham, England

[21] Appl. No.: 640,827

[22] Filed: Jan. 14, 1991

Related U.S. Application Data

[62] Division of Ser. No. 425,210, Oct. 20, 1989, Pat. No. 5,043,658.

[30] Foreign Application Priority Data

Mar. 9, 1988 [EP] European Pat. Off. .......... 3807798.1
Apr. 18, 1988 [DE] Fed. Rep. of Germany ....... 3812904

[51] Int. Cl.[5] ................................................. G01P 3/48
[52] U.S. Cl. ................................................. 324/160
[58] Field of Search ............................ 324/160, 166; 364/426.02, 424.03, 551.01, 571.07; 340/441

[56] References Cited

U.S. PATENT DOCUMENTS 4,876,527 10/1989 Oka et al. ............................ 340/441
4,928,242 5/1990 Suzuki .............................. 364/424.03

Primary Examiner—Walter E. Snow
Attorney, Agent, or Firm—Oblon, Spivak, McClelland, Maier & Neustadt

[57] ABSTRACT

For measuring the rotational speed of a wheel in an antilocking protected vehicle brake system a rotational speed sensor is provided in which in accordance with the rotational speed of the wheel signals are electromagnetically induced which have an amplitude and frequency which increase regularly with the rotational speed. When due to error sources the amplitude of the induced signal does not increase with the frequency of the signal a rotational speed measured value is determined by means of the measured amplitude, i.e. not on the basis of the measured frequency. To avoid erroneous measuring signals it may likewise be provided that when the amplitude of the signal does not increase with its frequency the last measured value of the frequency of the induced signal at which the amplitude still increased with the frequency is used to determine the speed of rotation.

2 Claims, 4 Drawing Sheets

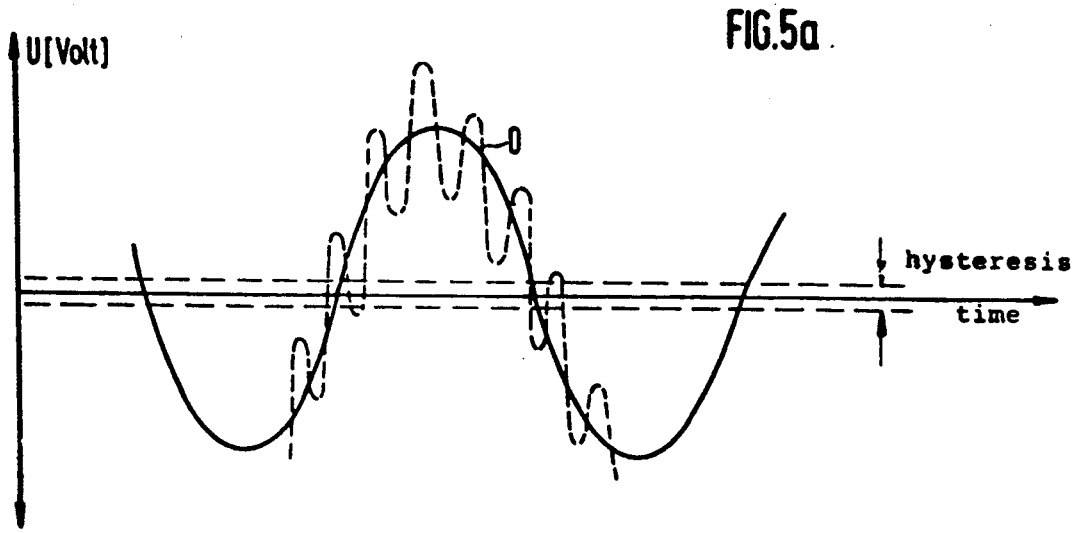
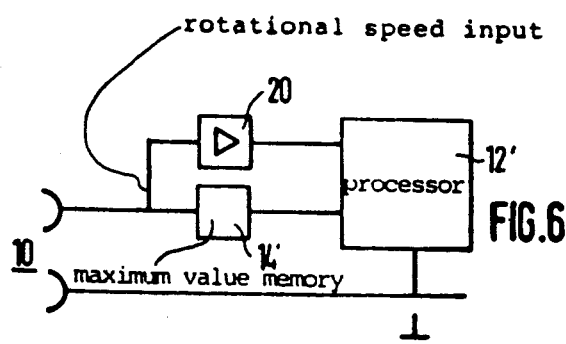

METHOD OF EXAMINING FUNCTIONABILITY OF A WHEEL SPEED SENSOR

This application is a division, of application Ser. No. 07/425,210, filed Oct. 20, 1989, now U.S. Pat. No. 5,043,658.

The invention relates to a device and a method for measuring the rotational speed of a wheel in an antilocking-protected vehicle brake system comprising a rotational speed sensor in which electromagnetic signals are induced corresponding to the rotational speed of the wheel and having an amplitude and frequency increasing regularly with the rotational speed.

The functionability of an antilocking system for brakes (ABS) depends inter alia substantially on whether the rotational speed sensors monitoring the wheel rotation behaviour furnish exact measurement values. If the speed sensors furnish inaccurate measurement results the ABS system cannot function.

It has therefore already been provided in the prior art to monitor the rotational speed sensors of the antilocking protected braked wheels. Thus, it is known for each speed sensor to provide a synchronizable astable multivibrator which when the speed sensor is connected and the wheel is stationary oscillates with a natural frequency low compared with the measuring pulse repetition frequency occurring when the wheel rotates and the natural oscillation of which stops in the presence of a short-circuit at the input and/or when the input is open.

It is also known to check the functionability of an antilocking system rotational speed sensor in that in dependence upon the vehicle velocity time periods are determined in which no measuring pulses are received by the rotational speed sensors.

Finally, to monitor the functionability of rotational speed sensors it has also been proposed to determine during a starting phase the velocity at which the rotational speed sensors associated with the individual wheels each generate a measuring signal having an amplitude above a threshold value. If this velocity is below a predetermined value the wheel whose rotational speed sensor has generated the inadequate signal is removed from the antilocking system control.

The rotational speed sensors which can be used in antilocking systems are known to the expert (cf. for example BOSCH TECHNISCHE BERICHTE, volume 7, 1980, No. 2, p. 84). Used at present, and also preferably employed with the present invention, are rotational speed sensors operating by the magnetic induction principle. If a toothed disc associated with the sensor rotates the magnetic flux at the sensor changes and a substantially sinusoidal AC voltage is induced in a coil of the sensor. The frequency of the induced voltage is a measure of the rotational speed of the monitored wheel.

Since the induced voltage depends on the change of the magnetic flux with time, with increasing rotational speed of the wheel not only the frequency of the induced AC voltage increases but also its amplitude. This means that at low rotational speeds the measuring signal becomes weaker.

Among others, axial and radial arrangements of toothed ring and coil are known.

The rotational speed measuring signal obtained in this manner can be subject to disturbances and falsified in a great many ways. In particular, an air gap between the tooth disc and the electrical conductor in which the induction is generated can change in the course of time. The magnetically induced signals can also be falsified by soiling, rust or the like.

It is known from DE-A 3,200,529 in a rotational speed sensor of the type described here to suppress interference oscillations. For this purpose, in dependence upon the time the respective peak value of the amplitude is measured and a reference parameter corrected.

The measurement of the rotational speed of an antilocking-protected braked wheel can however also be falsified by other influences. Thus, it is possible that due in particular to resonance oscillations of oscillatable parts near the rotational speed sensor, in particular so-called brake squeal, a signal of the rotational speed sensor contains harmonics which are superimposed on the actual measuring signal. By such harmonics the number of zero passages of the electromagnetically induced signal can be increased and this wrongly indicates an increase in the frequency of the signal without the rotational speed of the wheel having increased.

The invention is based on the problem of remedying this and avoiding erroneous signals generated in the manner described above.

For this purpose, in a method for measuring the rotational speed of a wheel in an antilocking-protected vehicle brake system comprising a rotational speed sensor in which in accordance with the rotational speed electromagnetic signals are induced having an amplitude and frequency which increases regularly with the rotational speed it is provided that when the amplitude of the signal does not increase with its frequency the amplitude is employed to recover the rotational speed measured values.

This solution according to the invention of the problem outlined above of harmonics is based on the recognition that when the amplitude of the signal induced electromagnetically in the rotational speed sensor does not increase with its frequency the frequency rise is not due to an increase in the rotational speed of the wheel but to interfering signals, for example harmonics. Thus, in this case the measured frequency no longer corresponds to the actual speed of rotation of the wheel but erroneously indicates a substantially higher speed of rotation. The amplitude however is not appreciably falsified by the harmonics, in particular when a certain averaging is carried out over periods which although smaller than the period of the electromagnetically induced signal are greater than the period of the interfering harmonics.

In one variant of the method described above for eliminating measurement errors due to harmonics it is provided that when the amplitude of the signal does not increase with its frequency the last measured frequency of the induced signal at which the amplitude still increased with the frequency is used for recovering the rotational speed measured values.

This variant of the invention is based on the recognition that the aforementioned harmonics usually occur suddenly and go hand in hand with a pronounced increase in the frequency of the induced signal. When such a frequency jump occurs, i.e. the amplitude of the induced signal is no longer proportional to its frequency, the measurement is as it were "frozen" at the last measured correct measurement value, i.e. the quantities which were measured when the amplitude was still regularly rising with the frequency are employed.

For this purpose, both the "frozen" value of the frequency and preferably the value of the amplitude can be used which are stored continuously with high clock frequency in the processor of the antilocking system.

It is also possible to filter out suddenly occurring frequency changes with a filter. The filter may be dependent upon the velocity.

Furthermore, the invention is based on the recognition that with rotational speed sensors of the type described the measurement result can depend very much on the temperature. In particular, the internal resistance of the rotational speed sensor increases so that fluctuations of the amplitude of the electromagnetically induced signal occur. The present invention also remedies this.

According to a preferred further development of the invention fluctuations of the internal resistance of the rotational speed sensor (10) with increasing temperature do not appreciably influence the measurement result as regards the rotational speed.

For this purpose an impedance converter is preferably used. The impedance converter simulates a very high resistance of for example 100 kiloohms in the measurement circuit between the rotational speed sensor and the evaluating circuit. The resistance generated by the impedance converter of for example 100 kiloohms is very large compared with the internal resistance of the rotational speed sensor and the input resistance of the evaluating circuit. Consequently, temperature-dependent changes of the internal resistance of the rotational speed sensor have no appreciable effect.

Hereinafter an example of embodiment of the invention will be explained in detail with reference to the drawings, wherein:

FIG. 5a shows schematically the variation of an induced AC voltage including an interfering harmonic;

FIGS. 5b and 5c show the digital measuring signal recovered with a variation of the induced AC voltage;

FIG. 6 is a block circuit diagram of a device for measuring the speed of rotation of an antilocking-protected braked wheel;

Figure 1:
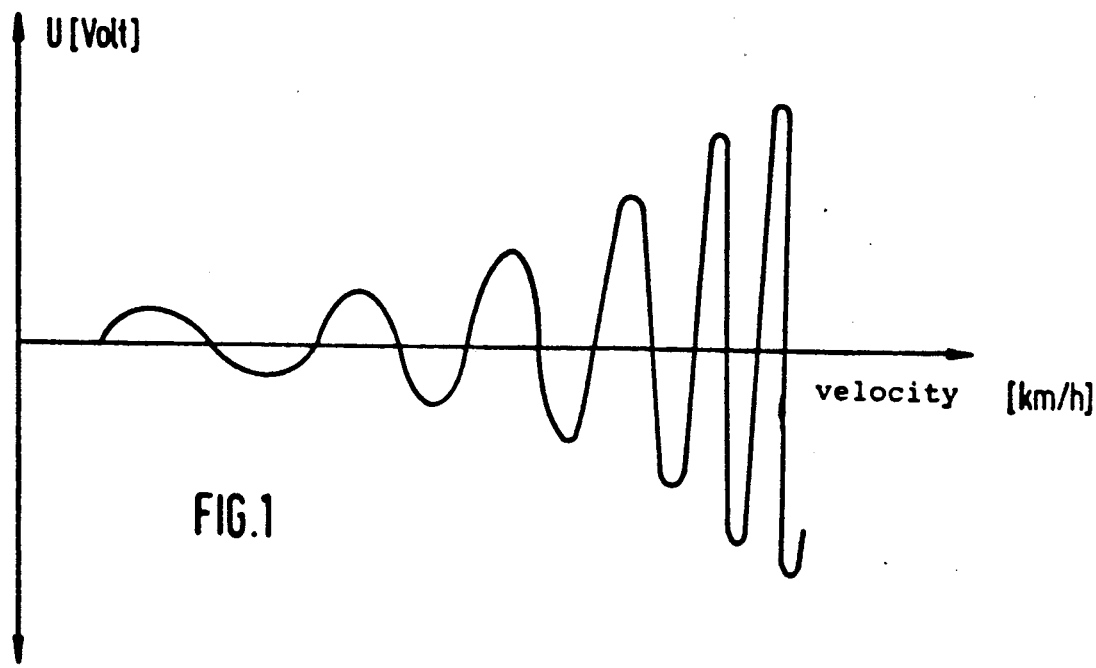
FIG. 1 shows schematically the variation of the AC voltage inductively produced by means of a known rotational speed sensor in dependence upon the velocity of the vehicle.

FIG. 1 shows the relationship already explained above between the vehicle velocity and the AC voltage inductively generated in the rotational speed sensor. With increasing velocity of the vehicle, i.e. increasing speed of rotation of the monitored wheel, the frequency of the induced AC voltage signal increases, as does its amplitude. The relationship is linear.

Figure 2:
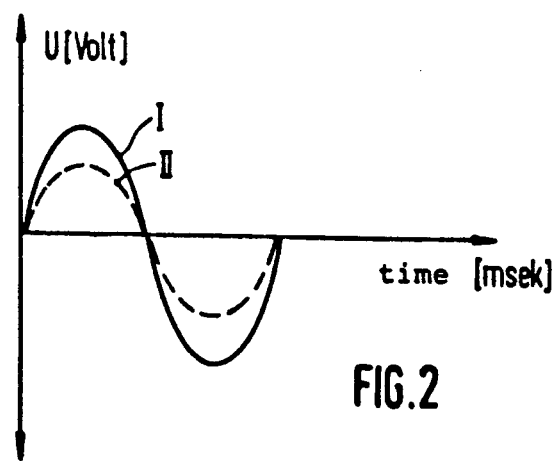
FIG. 2 shows the variation of the induced AC voltage at constant vehicle velocity but with different air gaps between the toothed ring and the coil of the sensor.

If the air gap between the toothed disc generating the magnetic flux and the conductor in which the voltage is induced increases the amplitude decreases. FIG. 2 shows according to curve I the induced voltage for a small air gap, i.e. with a rotational speed sensor functioning well, whereas with an enlarged air gap or induction otherwise impaired the amplitude drops in accordance with curve II for the same rotational velocity of the wheel.

Figure 3:
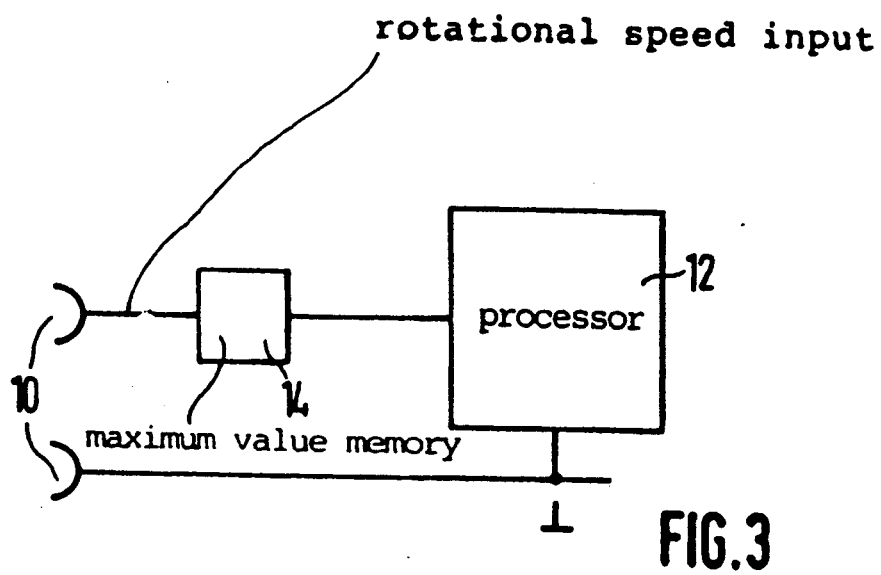
FIG. 3 is a block circuit diagram of a circuit for monitoring a rotational speed sensor.

FIG. 3 shows a block circuit diagram of a circuit for monitoring a rotational speed sensor 10. The analog output signals of the rotational speed sensor according to FIGS. 1 and 2 are entered into a maximum value memory 14. Instead of the maximum value memory 14 an average value memory may also be correspondingly provided. The memory 14 thus records only the maximum value of the analog signal, i.e. the amplitude. The analog signal is digitized and entered into the processor 12 of an antilocking system and there compared with a previously stored desired value for the same vehicle velocity. The comparison is thus in each case between a desired value which applies for a specific vehicle velocity and the measured value of the rotational speed sensor 10 actually measured at said vehicle velocity. The vehicle velocity is measured in the usual manner other than with the rotational speed sensor 10.

The program stored in the microprocessor 12 contains various tolerance thresholds as regards the comparison. In the case of differences between the compared values which, although they indicate changes of the magnetic induction in the rotational speed sensor do not endanger the functionability of the antilocking system, the driver is given an optical and/or acoustic warning so that he can check the rotational speed sensor and if necessary have it replaced. In the event of relatively large deviations the associated anti-locking system is switched off.

It is also possible to compare with each other the amplitudes of AC voltage signals generated by the different rotational speed sensors of the individual wheels because it is very improbable that all the rotational speed sensors simultaneously uniformly change their function.

Figure 4:
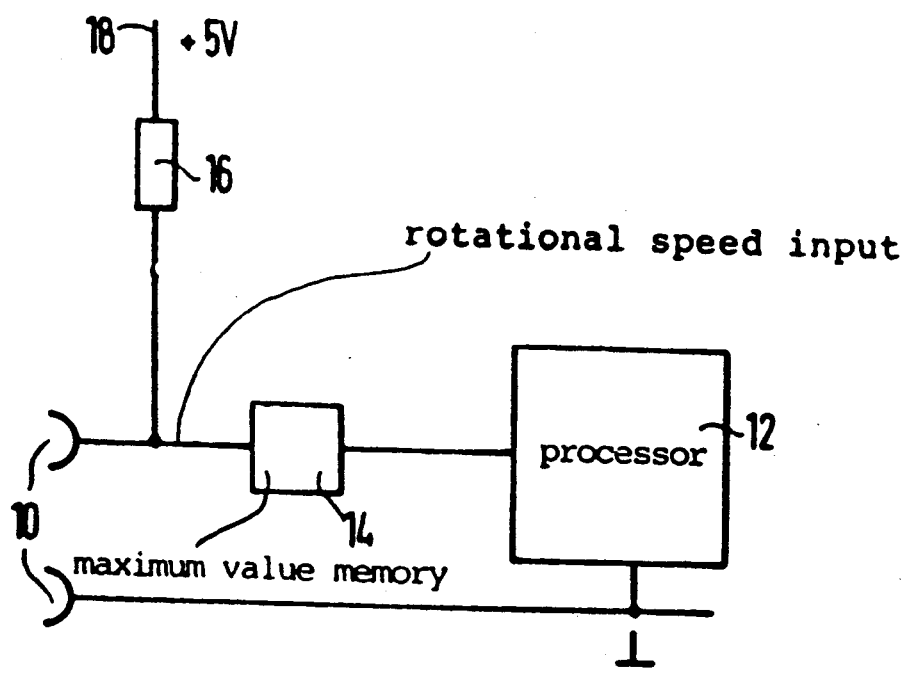
FIG. 4 is a modified block circuit diagram of a circuit for monitoring a rotational speed sensor.

FIG. 4 shows a further development of the circuit according to FIG. 3 in which the wheel sensor can be simultaneously monitored for current flow. For this purpose, at 18 via a resistance a current is fed into the sensor. In this manner the rotational speed sensor can be checked via a voltage measurement for interruption and/or short-circuiting.

FIGS. 5a, b and c show various signals over a common time scale. In FIG. 5a the variation of the signal induced electromagnetically in the rotational speed sensor is plotted for substantially constant velocity (rotational speed). The induced measuring signal is falsified by the harmonics described at the beginning which are caused by resonance oscillations of masses in or on the rotational speed sensor. The harmonics O have typically a substantially higher frequency than the electromagnetically induced signal. As apparent from FIGS. 5a, b and c the harmonics O result in a mutilation of the signal. In FIG. 5b the "regular" frequency measuring signal is plotted. For this purpose the induced analog signal passes through an input amplifier which furnishes a digitized signal. The harmonics O produce an increase in the number of zero passages according to FIG. 5c.

According to the invention the possible error signals explained above with reference to FIG. 5a are avoided in that in the microprocessor provided to evaluate the measuring signal monitoring is carried out to determine whether the amplitude of the electromagnetically induced signal increases with the frequency (rotational speed) in accordance with a predetermined proportionality. On occurrence of the harmonics O shown in FIG. 5 this is not the case because without an increase in the amplitude a sudden increase in the frequency can occur, cf. FIG. 5c. The microprocessor interprets this as indication of an error signal having occurred according to FIG. 5a. In this case, to ensure that a reliable measurement of the rotational speed is nevertheless possible the frequency of the electromagnetically induced signal is not used to measure the rotational speed but rather its amplitude, i.e. the peak values of the measured voltage.

In a modification of the example of embodiment of the invention described above, to avoid measurement errors caused for example by harmonics O according to FIG. 5a it can be provided that when the amplitude of the signal does not increase with its frequency the last measured frequency of the induced signal is used to recover the rotational speed measured values. In other words, the determination of the rotational speed is effected on the basis of the last measured frequency at which the amplitude of the induced signal was still increasing with the frequency in accordance with a predetermined proportionalilty. The processor performing the evaluation of the measurement data is programmed accordingly.

FIG. 6 shows a block circuit diagram according to a modification of the circuit shown in FIGS. 3 and 4. Corresponding components are provided with identical reference numrals. In the memory 14' peak values regarding the measuring signal (amplitude and/or frequency of the induced signal) used for the measurement are stored and supplied to the processor 12. In the processor 12' the actual measured values are compared with the stored desired values. The input amplifier 20 digitizes the signal in accordance with FIGS. 5b, c.

Figure 7:
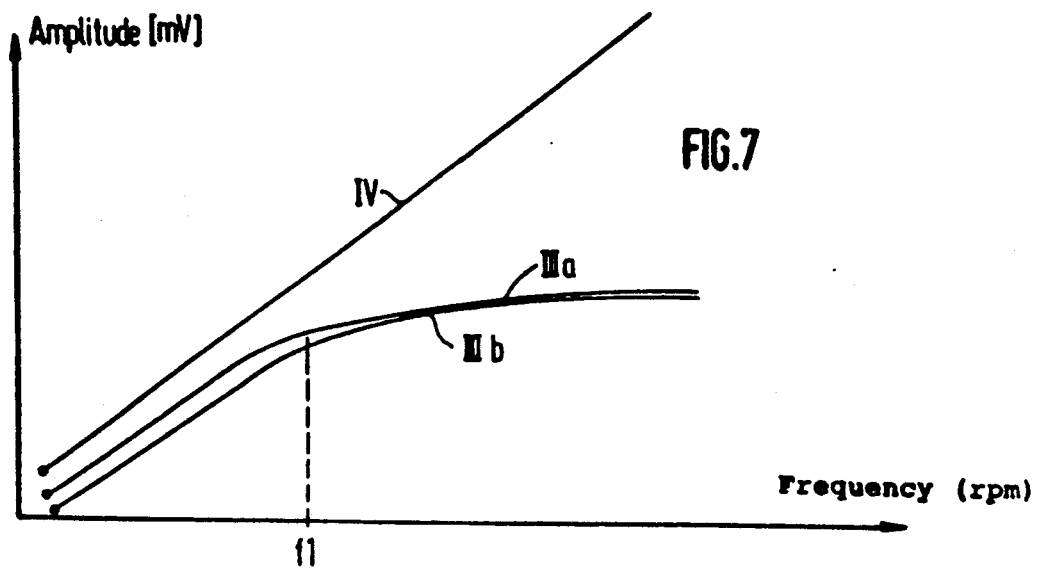
FIG. 7 shows schematically different variations of the amplitude (voltage) of a signal electromagnetically induced in a rotational speed sensor in dependence upon the speed of rotation (frequency)

FIG. 7 shows schematically curves IIIa, IIIb and IV according to which the amplitude of the signal induced in the rotational speed sensor can depend on the rotational speed (frequency). The amplitude is the voltage respectively induced in the rotational speed sensor.

Curve IIIa shows at a frequency $f_1$ a "saturation" of the amplitude, i.e. with increasing frequency the amplitude hardly rises or does not rise at all. This phenomenon is due to the fact that the amplitude is loaded by the input resistance of the signal evaluating circuit (high impedance). Curve IIIb shows the amplitude variation at a temperature of the rotational speed sensor higher compared with curve IIIa. The higher temperature results in a higher internal resistance. If the internal resistance increases with increasing temperature the measuring signal may be falsified.

Figure 8:
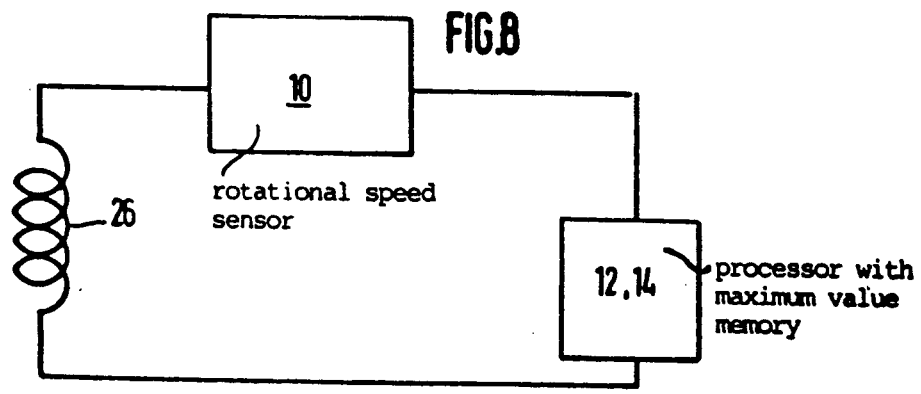
FIG. 8 shows schematically a circuit diagram to illustrate the internal resistances obtaining in a known circuit for measuring a rotational speed.

FIG. 8 explains schematically a conventional circuit arrangement for evaluating a signal induced in a rotational speed sensor. The reference numeral 10 denotes the rotational sensor of which the internal resistance can fluctuate in dependence upon the temperature. The electromagnetic signal is induced in a coil 26. The evaluating circuit is indicated by the reference numerals 12, 14 and has a given input impedance. Typically, the input impedance of the evaluating circuit 12, 14 is for example 1.4 kOhm. Now, if as described above the internal resistance of the rotational speed sensor 10 changes the measurement of the signal induced in the coil 26 by the evaluating circuit 12, 14 is falsified and furnishes for example the curve IIIb in FIG. 7.

Figure 9:
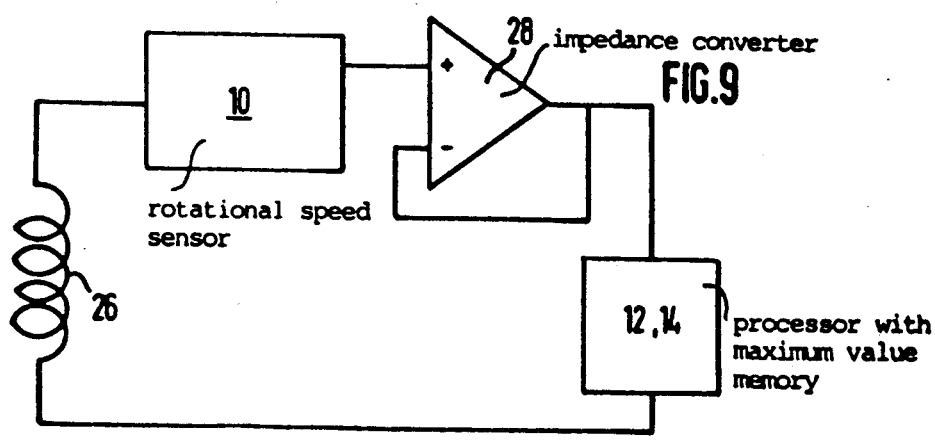
FIG. 9 shows schematically a circuit diagram of a circuit arrangement according to the invention for measuring a rotational speed.

FIG. 9 shows a solution of this problem which leads to the amplitude of the signal induced in the rotational speed sensor 10 rising correctly with the frequency in accordance with curve IV in FIG. 7. For according to the invention an impedance converter 28 is arranged in the circuit and has a resistance of for example 100 kOhm, i.e. a resistance which is large compared with the possibly fluctuating internal resistance of the rotational speed sensor 10. Thus, changes of the internal resistance of the rotational speed sensor due to temperature fluctuations can no longer appreciably falsify the measuring signal.

Alternatively, it is also possible to measure the temperature at the rotational speed sensor directly and enter a compensation program into the microprocessor which corrects the measured amplitude values directly in dependence upon the measured temperature values. However, for this purpose the temperature dependence of the internal resistance of the rotational speed sensor must be determined from the start and stored in the processor as a calibration curve.

We claim:

1. A method of examining the functionability of each of a plurality of sensors each of which measures the rotational speed of an individual wheel of a vehicle which is equipped with an antilocking-protected brake system which comprises a data processor (12, 14) including a memory, wherein said processor determines by means other than the sensor subject to examination for functionability, vehicle velocity, said method comprising the steps of storing in advance in said memory precalculated rotational speed values corresponding to vehicle velocities, comparing, when no braking operation is performed with said brake system, at an actually determined vehicle velocity the corresponding precalculated rotational speed value with the rotational speed measured by each one of said sensors and determining a malfunction of one of said sensors on the basis of the difference between said precalculated value and the rotational speed measured by the one of said sensors.

2. A method of examining the functionability of one sensor which measures the rotational speed of a wheel of a vehicle that is equipped with an antilocking-protected brake system which comprises a data processor including a memory, wherein said one sensor generates electromagnetically signals having an amplitude and a frequency both increasing regularly with the rotational speed of the wheel, and wherein the vehicle carries a plurality of other sensors, said method comprising the steps of comparing the amplitude of said electromagnetically generated signals generated by said one sensor with signals generated by said plurality of other sensors and determining that said one sensor does not function if the amplitude generated by it does not correspond to the amplitude generated by said other sensors.

* * * * *